United States Patent
Tsuei

(10) Patent No.: US 8,363,816 B2
(45) Date of Patent: Jan. 29, 2013

(54) ELECTRONIC DEVICE, INCOMING CALL ANSWERING AND REJECTION METHOD AND DIGITAL DATA STORAGE MEDIA

(75) Inventor: Yuan-Mao Tsuei, Taoyuan (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 933 days.

(21) Appl. No.: 12/463,485

(22) Filed: May 11, 2009

(65) Prior Publication Data

US 2009/0285383 A1    Nov. 19, 2009

(30) Foreign Application Priority Data

May 13, 2008    (TW) ................................ 97117543 A

(51) Int. Cl.
*H04M 1/64* (2006.01)
*H04B 1/38* (2006.01)
*H04L 12/66* (2006.01)
*G06F 3/00* (2006.01)

(52) U.S. Cl. ......... 379/242; 235/492; 345/173; 345/175; 370/254; 370/352; 375/222; 375/316; 379/88.22; 379/221.11; 379/265.03; 379/374.01; 455/411; 455/415; 455/420; 455/558; 455/566; 701/533; 709/220; 710/3; 715/784; 715/863

(58) Field of Classification Search .................. 345/173, 345/175; 370/352, 254; 379/88.22, 242, 379/221.11, 265.03, 374.01; 455/411, 414.1, 455/415, 420, 566, 558; 701/533; 710/3; 715/784, 863; 235/492; 709/220
See application file for complete search history.

(56) References Cited

U.S. PATENT DOCUMENTS

| | | | | |
|---|---|---|---|---|
| 4,972,882 | A * | 11/1990 | Kohashi | 141/1 |
| 5,463,661 | A * | 10/1995 | Moran et al. | 375/222 |
| 6,289,213 | B1 * | 9/2001 | Flint et al. | 455/420 |
| 6,728,553 | B1 * | 4/2004 | Lehmus et al. | 455/558 |
| 6,822,942 | B1 * | 11/2004 | Jackson et al. | 370/254 |
| 6,975,708 | B1 * | 12/2005 | Scherer | 379/88.22 |
| 7,526,533 | B1 * | 4/2009 | Bue et al. | 709/220 |
| 7,577,247 | B1 * | 8/2009 | Sutardja | 379/374.01 |
| 7,587,001 | B2 * | 9/2009 | Hazani et al. | 375/316 |
| 7,630,359 | B1 * | 12/2009 | Cherchali et al. | 370/352 |

(Continued)

FOREIGN PATENT DOCUMENTS

| | | |
|---|---|---|
| CN | 101059745 | 10/2007 |
| DE | 19528734 | 2/1997 |

(Continued)

OTHER PUBLICATIONS

English translation of DE19528734.

(Continued)

*Primary Examiner* — Gerald Gauthier

(74) *Attorney, Agent, or Firm* — McClure, Qualey & Rodack, LLP

(57) ABSTRACT

An incoming call answering and rejecting method, an electronic device, and a digital data storage media are provided. The method is applied to an electronic device having a touch screen and has the following steps. A request of an incoming call is received. A dragging signal is generated on the touch screen. When the dragging signal is an answering signal, the incoming call is answered. When the dragging signal is a rejecting signal, the incoming call is rejected.

14 Claims, 2 Drawing Sheets

U.S. PATENT DOCUMENTS

| | | | |
|---|---|---|---|
| 7,761,806 B2 * | 7/2010 | Kim | 715/784 |
| 7,762,470 B2 * | 7/2010 | Finn et al. | 235/492 |
| 7,813,451 B2 * | 10/2010 | Binder et al. | 375/316 |
| 7,848,507 B2 * | 12/2010 | Cheung et al. | 379/221.11 |
| 7,869,792 B1 * | 1/2011 | Zhou et al. | 455/411 |
| 7,899,499 B2 * | 3/2011 | Kang et al. | 455/566 |
| 7,974,609 B2 * | 7/2011 | Lee et al. | 455/415 |
| 7,978,685 B1 * | 7/2011 | Reams, III | 370/352 |
| 7,996,571 B2 * | 8/2011 | Salokannel | 710/3 |
| 8,046,721 B2 * | 10/2011 | Chaudhri et al. | 715/863 |
| 8,135,125 B2 * | 3/2012 | Sidhu et al. | 379/265.03 |
| 8,171,432 B2 * | 5/2012 | Matas et al. | 715/863 |
| 2004/0145574 A1 | 7/2004 | Xin et al. | |
| 2005/0079896 A1 * | 4/2005 | Kokko et al. | 455/566 |
| 2005/0201534 A1 * | 9/2005 | Ignatin | 379/88.22 |
| 2007/0189267 A1 * | 8/2007 | Metcalf et al. | 370/352 |
| 2008/0055263 A1 | 3/2008 | Lemay et al. | |
| 2008/0139184 A1 * | 6/2008 | Mottes | 455/414.1 |
| 2008/0188268 A1 * | 8/2008 | Kim et al. | 455/566 |
| 2008/0259053 A1 * | 10/2008 | Newton | 345/175 |
| 2009/0285383 A1 * | 11/2009 | Tsuei | 379/242 |
| 2010/0004853 A1 * | 1/2010 | Siereveld et al. | 701/201 |
| 2011/0025632 A1 * | 2/2011 | Lee | 345/173 |
| 2012/0113036 A1 * | 5/2012 | Lee | 345/173 |

FOREIGN PATENT DOCUMENTS

EP     1 847 913     10/2007

OTHER PUBLICATIONS

Chinese language office action dated Apr. 25, 2011.
English language translation of abstract of CN 101059745 (published Oct. 24, 2007).
"Topic, S2U2 v0.86—back to compatibility;" Nov. 20, 2007; http://forum.xda-developers.com/showthread.php?t=343256.
HTC Touch Phone Manual; 2007.

* cited by examiner

ELECTRONIC DEVICE, INCOMING CALL ANSWERING AND REJECTION METHOD AND DIGITAL DATA STORAGE MEDIA

This application claims the benefit of Taiwan application Serial No. 97117543, filed May 13, 2008, the subject matter of which is incorporated herein by reference.

FIELD OF THE APPLICATION

The application relates in general to an incoming call answering and rejecting method, and more particularly to an incoming call answering and rejecting method for use in an electronic device having a touch screen.

BACKGROUND

Touch screen is a touch-sensible screen that the user can directly operate elements on the screen. Due to the intuitive way of operation, touch screen has gained great popularity. Currently, touch screen is widely applied to many electronic devices such as a touch phone, a smartphone, or a personal digital assistance (PDA) phone.

As touch screen is activated by touch, accidental touch errors may occur easily. Let the touch phone be taken for example, when an incoming call is received, an answering button and a rejecting button are shown on the touch screen for the user to choose to answer or reject the call by click the answering button or the rejecting button, respectively. However, the answering button or the rejecting button may be accidentally touched by the user or by other objects and cause unintentionally answering or rejecting the call, and result in great inconvenience.

SUMMARY

The application is directed to an electronic device, an incoming call answering and rejecting method, and a digital data storage media. The incoming call is answered or rejected according to the dragging signal generated on the touch screen, hence avoiding accidental touch errors.

According to a first aspect of the present application, an electronic device comprising a call module, a touch screen, and a processing unit is provided. The call module receives a request of an incoming call. The touch screen generates a dragging signal. The processing unit is coupled to the call module and the touch screen. When the processing unit determines that the dragging signal is an answering signal, the call is answered. When the processing unit determines that the dragging signal is a rejecting signal, the call is rejected.

According to a second aspect of the present application, an incoming call answering and rejecting method applied to an electronic device having a touch screen is provided and has the following steps. A request of an incoming call is received. A dragging signal is generated on the touch screen. When the dragging signal is an answering signal, the incoming call is answered. When the dragging signal is a rejecting signal, the incoming call is rejected.

According to a third aspect of the present application, a digital data storage media is provided. The digital data storage media has many commands executable on an electronic device such that the electronic device executes an incoming call answering and rejecting method after executing these commands. The incoming call answering and rejecting method has the following steps. A request of an incoming call is received. A dragging signal is generated on the touch screen. When the dragging signal is an answering signal, the incoming call is answered. When the dragging signal is a rejecting signal, the incoming call is rejected.

The application will become apparent from the following detailed description of the preferred but non-limiting embodiments. The following description is made with reference to the accompanying drawings.

DETAILED DESCRIPTION OF THE APPLICATION

Figure 1:
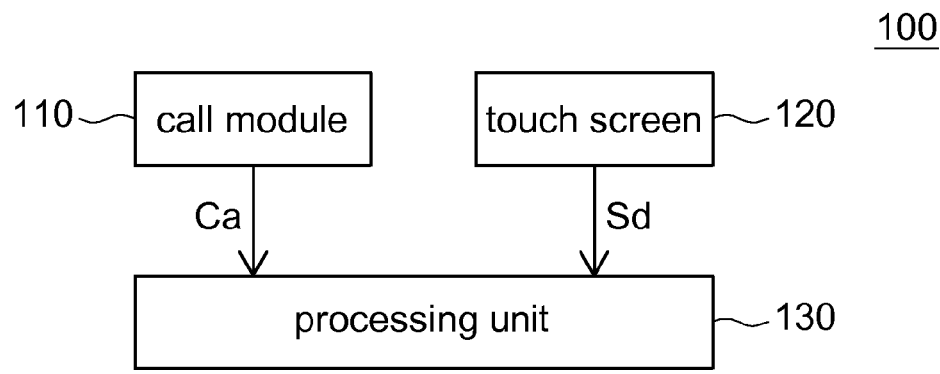
FIG. 1 shows a block diagram of an electronic device according to an embodiment of the application.

Referring to FIG. 1, a block diagram of an electronic device according to an embodiment of the application is shown. The electronic device 100, such as a touch phone, a smartphone, or a personal digital assistant (PDA) phone, comprises a call module 110, a touch screen 120, and a processing unit 130. The call module 110 receives a request of an incoming call "Ca." The touch screen 120 generates a dragging signal "Sd." The processing unit 130 is coupled to the call module 110 and the touch screen 120. When the processing unit 130 determines that the dragging signal Sd is an answering signal Sa, the incoming call Ca is answered. When the processing unit 130 determines that dragging signal Sd is a rejecting signal Sr, the incoming call Ca is rejected (ignored). Thus, the user answers or rejects (ignores) the incoming call Ca by generating a dragging signal on the touch screen 120, hence avoiding the touch screen 120 being touched accidentally to cause the incoming call be answered or rejected unexpectedly.

Figure 2:
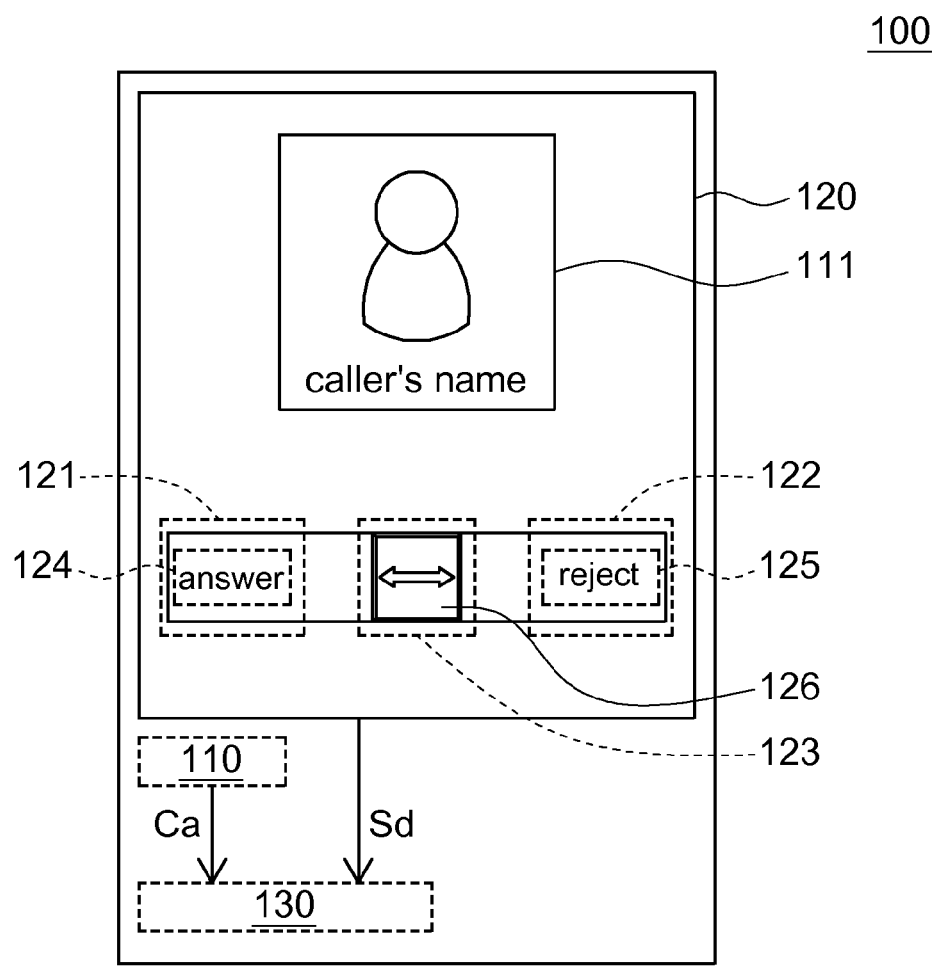
FIG. 2 shows an example of a simulated diagram of the electronic device of FIG. 1.

Referring to FIG. 2, an example of a simulated diagram of the electronic device of FIG. 1 is shown. When the call module 110 receives a request of an incoming call Ca, a caller pattern 111 is shown on the touch screen 120 to inform the user of the caller's information comprising at least one of the telephone number, the name, and the photo of the caller. The touch screen 120 has a first area 121, a second area 122, and an initial area 123. The first area 121 and the second area 122 are located at two opposite sides of the initial area 123. The answering signal Sa is a signal generated by dragging from the initial area 123 towards the first area 121, and the rejecting signal Sr is a signal generated by dragging from the initial area 123 towards the second area 122. Thus, the user can generate an answering signal Sa to answer the incoming call Ca by pressing his or her finger on the initial area 123 and dragging towards the first area 121. Or, the user can generate a rejecting signal Sr to reject the incoming call Ca by pressing his or her finger on the initial area 123 and dragging towards the second area 122.

In one embodiment of the application, a first reminder 124 is shown in the first area 121 of the touch screen 120 and a second reminder 125 is shown in the second area 122. Thus, the user is informed whether to answer the incoming call Ca by dragging from the initial area 123 towards the first area 121 or to reject the incoming call Ca by dragging from the initial area 123 towards the second area 122. In the present embodiment of the application, the first reminder 124 is an answering message such as "slide to answer", and the second reminder 125 is a rejecting message such as "slide to reject" or "slide to ignore."

In one embodiment of the application, a button 126 is shown in the initial area 123 of the touch screen 120. When the user generates the answering signal Sa by dragging from the initial area 123 towards the first area 121, the processing unit 130 controls the button 126 to move to the first area 121 from the initial area 123. When the user generates the rejecting signal Sr by dragging from the initial area 123 towards the second area 122, the processing unit 130 controls the button 126 to move the second area 122 from the initial area 123. Thus, the user is informed whether to answer or reject the incoming call Ca. In another embodiment, the processing unit 130 controls the button 126 to dynamically move to the first area 121 or the second area 122 from the initial area 123 so as to provide the user with virtual feeling of dragging the button. That is to say, the user may generate the answering signal Sa by dragging the button 126 towards the first area 121 from the initial area 123; and the user may generate the rejecting signal Sr by dragging the button 126 towards the second area 122 from the initial area 123. The user may release the button 126 after dragging the button 126 to the first area 121 or the second area 122. After the user releases the button 126, the processing unit 130 controls the button 126 to dynamically move back to the initial area 123 from the first area 121 or the second area 122 so as to provide the user with superior visual effect.

In the present embodiment of the application, the answering signal Sa or the rejecting signal Sr is generated by dragging from the initial area 123 towards the first area 121 or the second area 122. However, the above exemplification is not for limiting the application. In another embodiment of the application, the answering signal Sa may be generated by dragging from the first area 121 towards the initial area 123, and the rejecting signal Sr may be generated by dragging from the second area 122 towards the initial area 123.

In other embodiments of the application, the answering signal Sa may be generated by drawing a first symbol previously defined on the touch screen 120, and the rejecting signal Sr is a signal generated by drawing a second symbol previously defined on the touch screen 120. In one embodiment, the answering signal Sa only generated when the first symbol is substantially drawn in the first area 121, and the rejecting signal Sr only generated when the second symbol is substantially drawn in the second area 122. The first symbol or the second symbol, for example, is a pattern comprising a tick pattern, an X pattern, an a pattern, a clockwise circle pattern, or an anti-clockwise circle pattern, a symbol, or a character.

Figure 3:
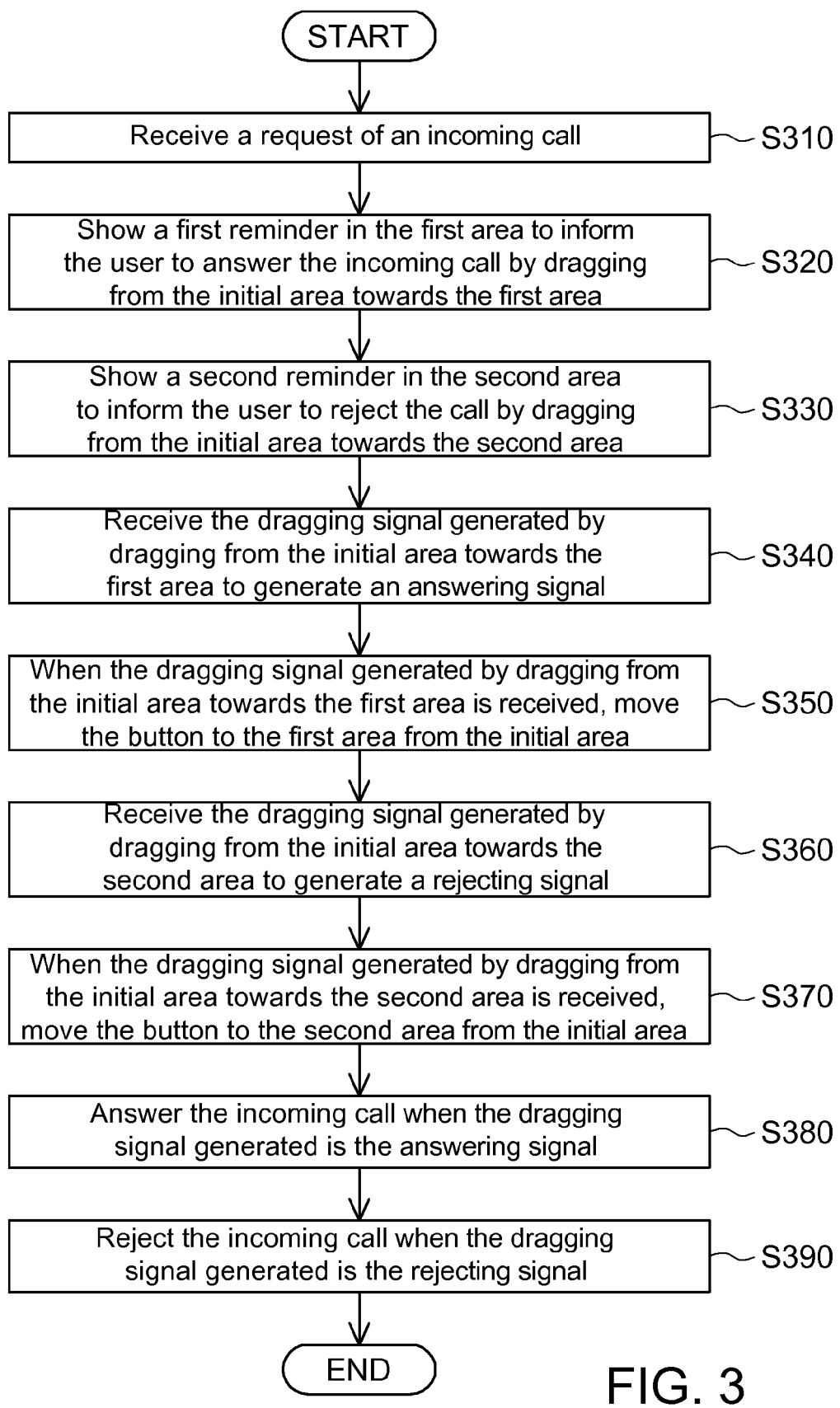
FIG. 3 shows an example of the incoming call answering and rejecting method according to an embodiment of the application.

Referring to FIG. 3, an example of the incoming call answering and rejecting method according to an embodiment of the application is shown. In the incoming call answering and rejecting method of the present embodiment of the application, the steps of FIG. 3 are executed by an electronic device 100 of FIG. 2, but the application is not limited thereto. Anyone who is skilled in the technology of the application will understand that the procedures and sequences of the incoming call answering and rejecting method can be modified or adjusted according to actual needs.

Firstly, the method begins at step S310, a request of an incoming call Ca is received by a call module 110. Next, the method proceeds to step S320, a first reminder 124 is shown in the first area 121 to inform the user to answer the incoming call Ca by dragging from the initial area 123 towards the first area 121. The first reminder 124 is an "Answer" message for example. Then, the method proceeds to step S330, a second reminder 125 is shown in the second area 122 to inform the user to reject the call Ca by dragging from the initial area 123 towards the second area 123. The second reminder 125 is a "Reject" or "Ignore" message for example.

Then, the method proceeds to step S340, the touch screen 120 receives the dragging signal Sd generated by dragging from the initial area 123 towards the first area 121 to generate an answering signal Sa. After that, the method proceeds to step S350, when the touch screen 120 receives the dragging signal Sd generated by dragging from the initial area 123 towards the first area 121, the processing unit 130 moves the button 126 to the first area 121 from the initial area 123. Preferably, the button 126 is dynamically moved to the first area 121 from the initial area 123.

Afterwards, the method proceeds to step S360, the touch screen 120 receives the dragging signal Sd generated by dragging from the initial area 123 towards the second area 122 to generate a rejecting signal Sr. Then, the method proceeds to step S370, when the touch screen 120 receives the dragging signal Sd generated by dragging from the initial area 123 towards the second area 122, the processing unit 130 moves the button 126 to the second area 122 from the initial area 123. Preferably, the button 126 is dynamically moved to the second area 121 from the initial area 123.

Then, the method proceeds to step S380, when the generated dragging signal Sd is the answering signal Sa, the incoming call Ca is answered. Lastly, the method proceeds to step S390, when the generated dragging signal Sd is the rejecting signal Sr, the incoming call Ca is rejected.

In another embodiment, in step S320, the first reminder 124 shown in the first area 121 may be a pattern, a symbol, or characters informing the user that he or she can answer the incoming call Ca by dragging from the first area 121 towards the initial area 123. Likewise, in step S330, the second reminder 125 shown in the second area 122 may be a pattern, a symbol, or characters informing the user that he or she can reject the incoming call Ca by dragging from the second area 123 towards the initial area 123.

In another embodiment, the answering signal Sa can be a signal generated by drawing a first symbol previously defined on the touch screen 120, and the rejecting signal Sr can also be a signal generated by drawing a second symbol previously defined on the touch screen 120. In one embodiment, the answering signal Sa only generated when the first symbol is substantially drawn in the first area 121, and the rejecting signal Sr only generated when the second symbol is substantially drawn in the second area 122. The first symbol or the second symbol, for example, is a pattern comprising a tick pattern, an X pattern, an a pattern, a clockwise circle pattern, or an anti-clockwise circle pattern, a symbol, or a character.

The above incoming call answering and rejecting method may be programmed and stored in a digital data storage medium executable on the handheld electronic device 100. The digital data storage medium, such as secure digital (SD) card, memory stick (MS), and multimedia memory card (MMC), has the above application executing function after the application executing method is executed on the handheld electronic device 100.

According to the electronic device, the incoming call answering and rejecting method, and the digital data storage media disclosed in the above embodiments of the application, the incoming call is answered or rejected according to the dragging signal received by the touch screen. When the generated dragging signal is a previously defined answering signal, the incoming call is answered. When the generated dragging signal is a previously defined rejecting signal, the incoming call is rejected. The answering signal and the rejecting signal can be generated according to "dragging from the initial area towards a particular area on the touch screen" or "drawing a particular pattern or symbol on the touch screen".

Thus, the user will no more answer or reject the incoming call unintentionally caused by accidental touch and gain superior use experience.

While the application has been described by way of example and in terms of a number of embodiments, it is to be understood that the application is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic device, comprising:
a call module for receiving a request of an incoming call;
a touch screen for detecting a touch and generating a touch signal, and wherein an initial area, a first area, a second area, and a button representing the initial area are displayed on the touch screen; and
a processing unit coupled to the call module and the touch screen, wherein when the processing unit determines that the touch signal is an answering signal, the call is answered, and when the processing unit determines that touch signal is a rejecting signal, the call is rejected, the answering signal indicating a drag from the initial area to the first area, and the rejecting signal indicating another drag from the initial area to the second area, wherein when the touch is detected on the button, the button is moved according to the drag movement or the another drag movement of the touch signal.

2. The electronic device according to claim 1, wherein the touch screen shows a first reminder in the first area for informing a user to answer the call by dragging from the initial area towards the first area; and the touch screen shows a second reminder in the second area for informing the user to reject the incoming call by dragging from the initial area towards the second area.

3. The electronic device according to claim 2, wherein the first reminder comprises an answering message, and the second reminder comprises a rejecting message.

4. The electronic device according to claim 1, wherein the processing unit controls the button to dynamically move to the first area or the second area from the initial area.

5. The electronic device according to claim 1, wherein the first area and the second area are located at two opposite sides of the initial area.

6. An incoming call answering and rejecting method applied to an electronic device having a touch screen for detecting a touch and generating a touch signal, wherein the incoming call answering and rejecting method comprises:
receiving a request of an incoming call;
displaying an initial area, a first area, a second area, and a button representing the initial area on the touch screen; and
moving the button representing the initial area from the initial area to the first area and answering the call when receiving the touch signal generated by dragging from the initial area to the first area; or
moving the button representing the initial area from the initial area to the second area and rejecting the call when receiving the touch signal generated by dragging from the initial area to the second area.

7. The incoming call answering and rejecting method according to claim 6, further comprises:
showing a first reminder in the first area for informing a user to answer the call by dragging from the initial area towards the first area; and
showing a second reminder in the second area for informing the user to reject the incoming call by dragging from the initial area towards the second area.

8. The incoming call answering and rejecting method according to claim 6, further comprising dynamically moving the button to the first area or the second area from the initial area.

9. A digital data storage media having a plurality of commands executable on an electronic device having a touch screen for detecting a touch and generating a touch signal for the electronic device to execute an incoming call answering and rejecting method, wherein the incoming call answering and rejecting method comprises:
receiving a request of an incoming call;
displaying an initial area, a first area, a second area, and a button representing the initial area on the touch screen; and
moving the button representing the initial area from the initial area to the first area and answering the call when receiving the touch signal generated by dragging from the initial area to the first area; or
moving the button representing the initial area from the initial area to the second area and rejecting the call when receiving the touch signal generated by dragging from the initial area to the second area.

10. An electronic device, comprising:
a call module for receiving a request of an incoming call;
a touch screen for detecting a touch and generating a touch signal, and wherein an initial area, a first area, a second area, a button representing the first area, and another button representing the second area are displayed on the touch screen; and
a processing unit coupled to the call module and the touch screen, wherein when the processing unit determines that the touch signal is an answering signal, the call is answered, and when the processing unit determines that touch signal is a rejecting signal, the call is rejected, the answering signal indicating a drag from the first area to the initial area, and the rejecting signal indicating another drag from the second area to the initial area, wherein when the touch is detected on the button representing the first area, the button representing the first area is moved according to a drag movement of the touch signal, and wherein when the touch is detected on the another button representing the second area, the another button representing the second area is moved according to another drag movement of the touch signal.

11. The electronic device according to claim 10, wherein the touch screen shows a first reminder in the initial area for informing a user to answer the call by dragging from the first area towards the initial area; and the touch screen shows a second reminder in the initial area for informing the user to reject the incoming call by dragging from the second area towards the initial area.

12. The electronic device according to claim 10, wherein the first area and the second area are located at two opposite sides of the initial area.

13. An incoming call answering and rejecting method applied to an electronic device having a touch screen for detecting a touch and generating a touch signal, wherein the incoming call answering and rejecting method comprises:
receiving a request of an incoming call;
displaying an initial area, a first area, a second area, a button representing the first area, and another button representing the second area; and
moving the button representing the first area from the first area to the initial area and answering the call when receiving the touch signal generated by dragging from the first area to the initial area; or moving the another button representing the second area from the second area to the initial area and rejecting the call when receiving the touch signal generated by dragging from the second area to the initial area.

14. The incoming call answering and rejecting method according to claim 13, further comprises:

showing a first reminder in the initial area for informing a user to answer the call by dragging from the first area towards the initial area; and showing a second reminder in the initial area for informing the user to reject the incoming call by dragging from the second area towards the initial area.

* * * * *